(12) United States Patent
Cong et al.

(10) Patent No.: US 8,786,663 B2
(45) Date of Patent: Jul. 22, 2014

(54) METHOD AND EQUIPMENT FOR REALIZING CONCURRENCY OF VOICE AND DATA

(75) Inventors: Wen Cong, Shenzhen (CN); Qingzhi Zhang, Shenzhen (CN); Lei Qin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 220 days.

(21) Appl. No.: 13/577,675

(22) PCT Filed: Jun. 29, 2010

(86) PCT No.: PCT/CN2010/074727
§ 371 (c)(1),
(2), (4) Date: Aug. 8, 2012

(87) PCT Pub. No.: WO2011/134198
PCT Pub. Date: Nov. 3, 2011

(65) Prior Publication Data
US 2012/0300013 A1    Nov. 29, 2012

(30) Foreign Application Priority Data

Apr. 26, 2010    (CN) .......................... 2010 1 0155215

(51) Int. Cl.
*H04N 7/14*    (2006.01)
*H04L 29/06*    (2006.01)

(52) U.S. Cl.
CPC ............ *H04L 65/80* (2013.01); *H04L 65/1089* (2013.01)
USPC .................. 348/14.02; 348/14.03; 348/14.08; 348/14.09

(58) Field of Classification Search
USPC ............ 348/14.01–14.09; 455/436, 559, 461, 455/435.3, 440; 709/227
See application file for complete search history.

(56) References Cited

U.S. PATENT DOCUMENTS 8,330,792 B2 * 12/2012 Beers et al. ................. 348/14.08
8,620,319 B1 * 12/2013 Thandu et al. ................. 455/436

(Continued)

FOREIGN PATENT DOCUMENTS

CN      1761255 A      4/2006
CN    101340670 A      1/2009

(Continued)

OTHER PUBLICATIONS

International Search Report dated Feb. 10, 2011 for PCT/CN2010/074727.

*Primary Examiner* — Joseph J Nguyen
(74) *Attorney, Agent, or Firm* — Banner & Witcoff, Ltd.

(57) ABSTRACT

A method and apparatus for realizing concurrency of voice and data are disclosed, wherein the method includes: step A, a network side receiving a voice call request, and when detecting that a called mobile terminal of the voice call request is carrying out a data service connection, executing step B; step B, the network side notifying a calling mobile terminal of the voice call request of a situation that the called mobile terminal is carrying out the data service connection, and prompting the calling mobile terminal to re-initiate a call in a manner of a video call simultaneously. The present invention achieves that the called mobile terminal can notifying the calling mobile terminal of the situation that the called mobile terminal is in the data connection and does not want the data connection to be interrupted when the called mobile terminal is carrying out the data service connection.

15 Claims, 6 Drawing Sheets

(56) References Cited

U.S. PATENT DOCUMENTS

2003/0074451 A1* 4/2003 Parker et al. .................. 709/227
2012/0040714 A1* 2/2012 Wu ............................ 455/552.1

FOREIGN PATENT DOCUMENTS

| CN | 101521929 A | 9/2009 |
| CN | 101534504 A | 9/2009 |

* cited by examiner

METHOD AND EQUIPMENT FOR REALIZING CONCURRENCY OF VOICE AND DATA

TECHNICAL FIELD

The present invention relates to the communication field, and particularly, to a method and apparatus for realizing concurrency of voice and data.

BACKGROUND OF THE RELATED ART

The wireless communication world is a communication environment constructed by a plurality of networks such as a wireless local area network, a mobile communication system, a satellite communication system, a digital broadcast and fixed access system, and so on; however, network architectures, transmission modes, transmission speeds, transmission qualities, quality of service strategies, resource management modes of various networks are significantly different. See from technology and market, more humanized communication service will obtain more praise and trust of mobile terminals, and a service provider for corresponding services can obtain better market return.

At present, various mobile terminals generally applied in the related art still cannot realize the concurrency of voice call and data service. Taking an easy example for example, when the mobile terminal is carrying out a data service connection, if there is a voice call accessing, since the priority of the voice call is higher, then at the moment, whether the mobile terminal answers or not, the current data service will be interrupted; and at the moment, when the mobile terminal is downloading relatively important data or some paid documents, loss will be caused to the mobile terminal.

CONTENT OF THE INVENTION

Based on the above analysis, the present invention is intended to provide a method and apparatus of realizing concurrency of voice and data, so as to solve the problem, which exists in the related art, that the mobile terminal cannot realize the concurrency of the voice call and the data service.

The purpose of the present invention is achieved by the following technical solution.

The present invention provides a method for realizing concurrency of voice and data, and the method comprises:

in step A, a network side receiving a voice call request, and when determining by detecting that a called mobile terminal of the voice call request is carrying out a data service connection, executing step B; and in step B, the network side notifying a calling mobile terminal sending the voice call request out of a situation that the called mobile terminal is carrying out the data service connection, and at the same time prompting the calling mobile terminal to re-initiate a call in a manner of a video call.

Furthermore, step A particularly comprises:

in step A1, the network side determining whether the called mobile terminal is carrying out the data service connection by detecting that a frequency point where the called mobile terminal of the voice call request is located is different, if the called mobile terminal is carrying out the data service connection, then executing step A2, otherwise, directly initiating a voice call to the called mobile terminal; and in step A2, detecting whether the called mobile terminal has opened a voice and data concurrency function, if the called mobile terminal has opened the voice and data concurrency function, then executing the step B, otherwise, cutting off the data service connection which is being carried out by the called mobile terminal and initiating the voice call to the called mobile terminal.

Furthermore, the method further comprises:

in step C, when the network side detecting that the calling mobile terminal re-initiates the call in the manner of the video call, initiating an incoming video call request to the called mobile terminal in a manner of packet transmission.

Furthermore, the method further comprises:

in step D, the called mobile terminal detecting that there is an incoming video call request when being carrying out the data service connection, and selecting to answer the incoming video call or reject the incoming video call according to a user requirement of the called mobile terminal.

Furthermore, step D particularly comprises:

in step D1, when the called mobile terminal detects that there is an incoming video call request, judging whether the called mobile terminal is carrying out the data service connection, if the called mobile terminal is carrying out the data service connection, then executing step D2, otherwise, directly answering the incoming video call or reject the incoming video call; and in step D2, prompting a user of the called mobile terminal whether to answer the incoming video call, if yes, then the user of the called mobile terminal answering the incoming video call, otherwise, rejecting the incoming video call.

Furthermore, in step D2, the called mobile terminal answering the incoming video call comprises: the user of the called mobile terminal answering the incoming video call in a manner of only receiving a video stream, only receiving an audio stream, or simultaneously receiving a video stream and an audio stream.

Wherein, the opening the voice and data concurrency function comprises:

a mobile terminal sending a request of opening the voice and data concurrency function to the network side; and after the network side receives the request of opening the voice and data concurrency function sent from the mobile terminal, recording a state that the mobile terminal has opened the voice and data concurrency service function regarding to the mobile terminal which has opened a data service and has opened a video call service.

Furthermore, for a mobile terminal which has opened and started the voice and data concurrency function, when the mobile terminal, as the calling mobile terminal, prepares to initiate the voice call request, the method further comprises:

detecting whether the mobile terminal is carrying out the data service connection, if the mobile terminal is carrying out the data service connection, then notifying a user of the mobile terminal of a situation that the mobile terminal is carrying out the data service connection, and initiating a corresponding video call according to a selection of the user of the mobile terminal, otherwise, the mobile terminal directly initiating the voice call request.

The present invention also provides an apparatus for realizing concurrency of voice and data, and the apparatus comprises: a detection module and a notification module; wherein, the detection module is configured to detect whether a called mobile terminal which receives a voice call request is carrying out a data service connection, and trigger the notification module when determining by detecting that the called mobile terminal of the voice call request is carrying out the data service connection; and the notification module is configured to notify a calling mobile terminal which sends the voice call request out of a situation that the called mobile terminal is carrying out the data service connection, and at the same time prompt the calling mobile terminal to re-initiate a call in a manner of a video call.

Furthermore, the detection module comprises: a first detection sub-module and a second detection sub-module; wherein, the first detection sub-module is configured to determine whether the called mobile terminal is carrying out the data service connection by detecting that a frequency point where the called mobile terminal of the voice call request is located is different when receiving the voice call request, and if the called mobile terminal is carrying out the data service connection, trigger the second detection sub-module, and if the called mobile terminal does not carry out the data service connection, trigger a network side to directly initiate a voice call to the called mobile terminal; and the second detection sub-module is configured to detect whether the called mobile terminal has opened a voice and data concurrency function, if the called mobile terminal has opened the voice and data concurrency function, trigger the notification module, and if the called mobile terminal does not open the voice and data concurrency function, trigger the network side to cut off the data service connection which is being carried out by the called mobile terminal and initiating a voice call to the called mobile terminal.

Furthermore, the detection module further comprises:

a third detection sub-module, configured to detect whether the calling mobile terminal re-initiates the call in the manner of the video call, and if detecting that the calling mobile terminal re-initiates the call in the manner of the video call, trigger a network side to initiate an incoming video call request to the called mobile terminal in a manner of packet transmission.

Furthermore, the apparatus further comprises:

a voice and data concurrency function setting module, configured to, when receiving a request of opening the voice and data concurrency function sent by a mobile terminal, for a mobile terminal which has opened a data service and has opened a video call service, record a state that the mobile terminal has opened the voice and data concurrency service function.

The beneficial effects of the present invention are as follows:

the present invention can realize that the called mobile terminal can notify the calling mobile terminal of the situation that the called mobile terminal is in the data connection and does not want the data connection to be interrupted when the called mobile terminal is carrying out the data service connection, thereby ensuring that it is not interrupted accidentally that the called mobile terminal is downloading the important data.

The other features and advantages of the present invention will be set forth in the subsequent specification, and partly become apparent from the specification, or are understood by implementing the present invention. The purpose and other advantages of the present invention can be realized and obtained by the particularly specified structure in the specification, claims and accompanying drawings.

PREFERRED EMBODIMENTS OF THE PRESENT INVENTION

Hereinafter the preferred embodiments of the present invention will be described in detail in combination with the accompanying drawings, wherein the accompanying drawings constitute a part of the present application and illustrate the principle of the present invention with the embodiments of the present invention. For the sake of clarity and simplification, when it may cause the subject matter of the present invention to be unclear, the detailed and specific illustration of well-known functions and structures of devices described herein will be omitted.

The method according to embodiments of the present invention will first be illustrated in detail in combination with FIG. 1 to FIG. 5.

Figure 1:
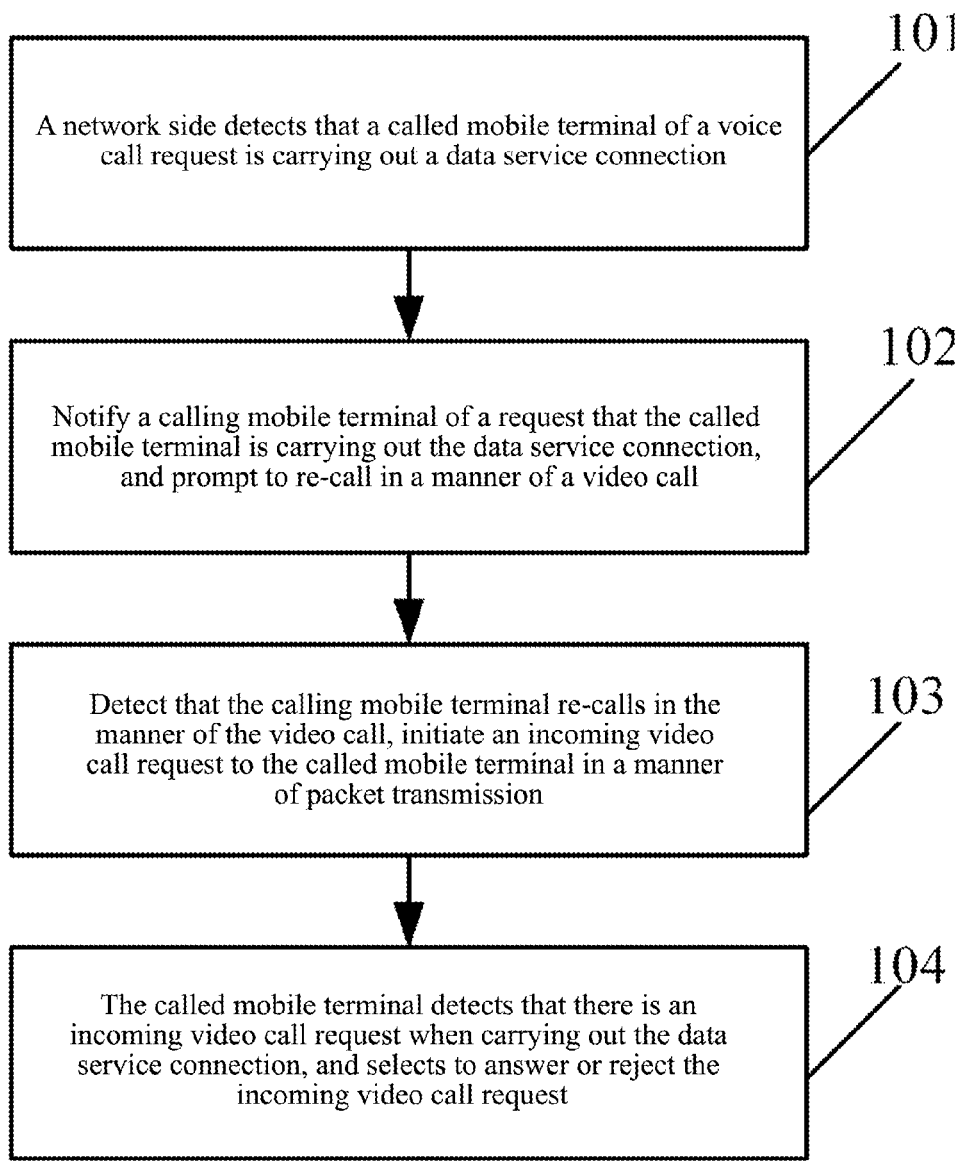
FIG. 1 is a schematic flowchart of a method according to an embodiment of the present invention.

As shown in FIG. 1, the method according to an embodiment of the present invention mainly includes the following steps.

In step 101, a network side receives a voice call request, and when it determines by detecting that a called mobile terminal of the voice call request is carrying out a data service connection, step 102 is executed.

In step 102, the network side notifies a calling mobile terminal which sends the voice call request out of a situation that the called mobile terminal is carrying out the data service connection, and prompts the calling mobile terminal to re-initiate a call in a manner of a video call at the same time.

In step 103, when the network side detects that the calling mobile terminal re-initiates the call in the manner of the video call, it initiates an incoming video call request to the called mobile terminal in a manner of packet transmission.

In step 104, the called mobile terminal detects that there is an incoming video call request when carrying out the data service connection, and selects to answer or reject the incoming video call request according to the user requirement of the called mobile terminal.

The main object achieved by the embodiment of the present invention includes: the situation that the called mobile terminal is in the data connection and does not want the data connection to be interrupted when the called mobile terminal is carrying out the data service connection is notified to the calling mobile terminal, thereby ensuring that the important data download of the called mobile terminal will not be interrupted accidentally; furthermore, when carrying out the data service connection, the called mobile terminal can realize the concurrency of voice and data by a video call capability based on an EVDO technology.

In order to be convenient for understanding the method according to the embodiment of the present invention, the method according to the embodiment of the present invention will be illustrated in detail hereinafter.

Figure 2:
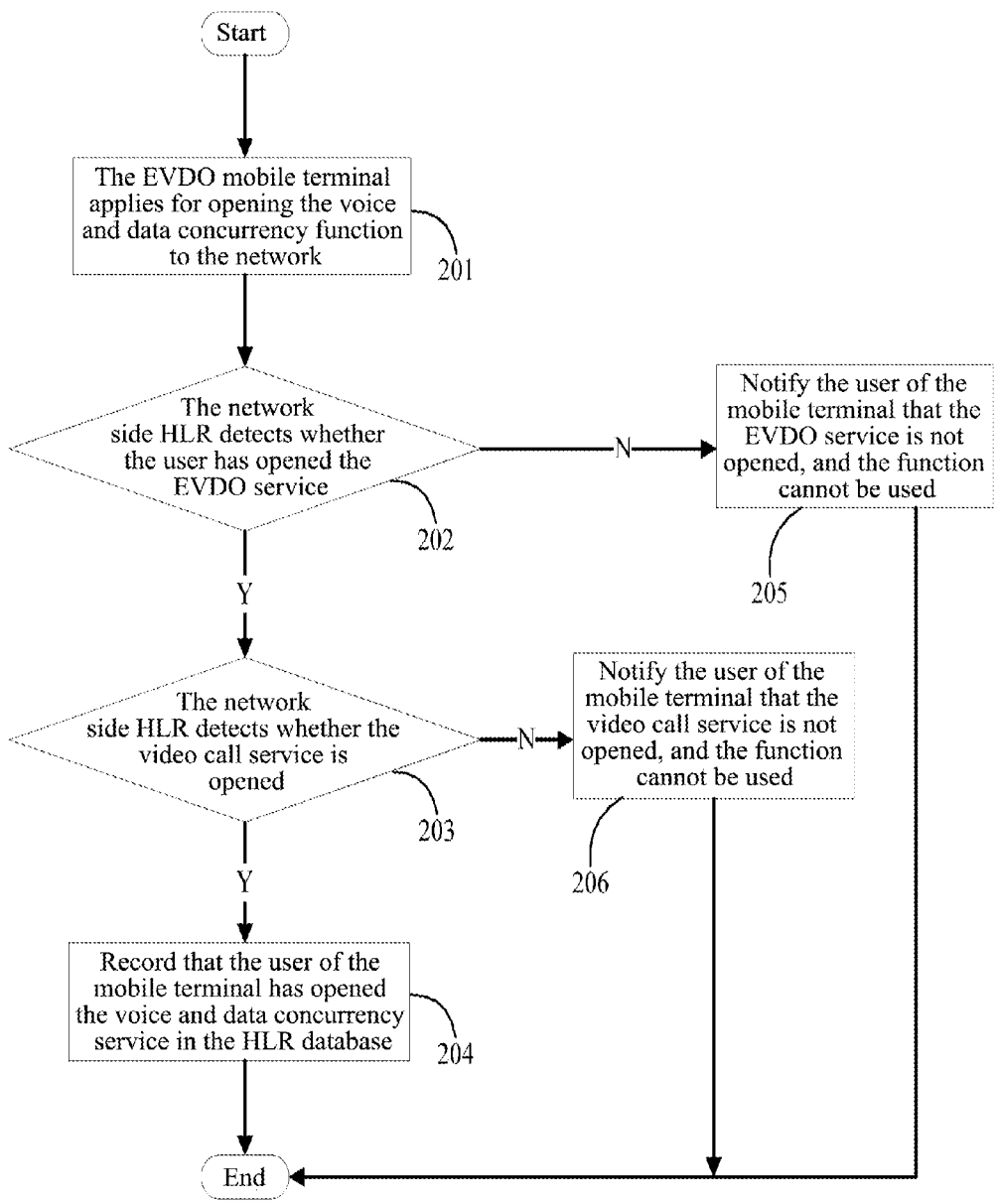
FIG. 2 is a schematic flowchart of a mobile terminal registering to a network side to open a voice and data concurrency function in a method according to an embodiment of the present invention.

As shown in FIG. 2, FIG. 2 is a schematic flowchart of a mobile terminal registering to a network side to open a voice and data concurrency function in a method according to an embodiment of the present invention, and it mainly includes the following steps.

In step 201, an EVDO mobile terminal registers to a network to apply for opening a voice and data concurrency function by a setting function, wherein the "apply for" herein can be similar to an application form of added services of a CDMA mobile terminal, for example, applying for by dialing a certain added service number; and step 202 is continued. EVDO represents Evolution Data Only, which refers to an effective enhancement means in an aspect of providing data services for a CDMA2000 1X network.

In step 202, the network side queries a database of a home location register (HLR) to which that mobile terminal belongs after receiving the application of opening of the step 201, determines whether that mobile terminal has opened an EVDO data service, if the mobile terminal has opened the EVDO data service, then step 203 is continued, and if the mobile terminal does not open the EVDO data service, it goes to step 205.

In step 203, the network side continues to query the HLR, and detects whether that mobile terminal has opened a video call service, if the mobile terminal has opened the video call service, then step 204 is continued, and if the mobile terminal does not open the video call service, it goes to step 206.

In step 204, an open state of the user of that mobile terminal opening the voice and data concurrency service is recorded in the HLR database; and the current flow ends.

In step 205, the mobile terminal does not open the EVDO data service, and the network side prompts the user of the mobile terminal that the voice and data concurrency function cannot be started; and the current flow ends.

In step 206, the mobile terminal does not open the video call service, and the network side prompts the user of the mobile terminal that the voice and data concurrency function cannot be started; and the current flow ends.

Figure 3:
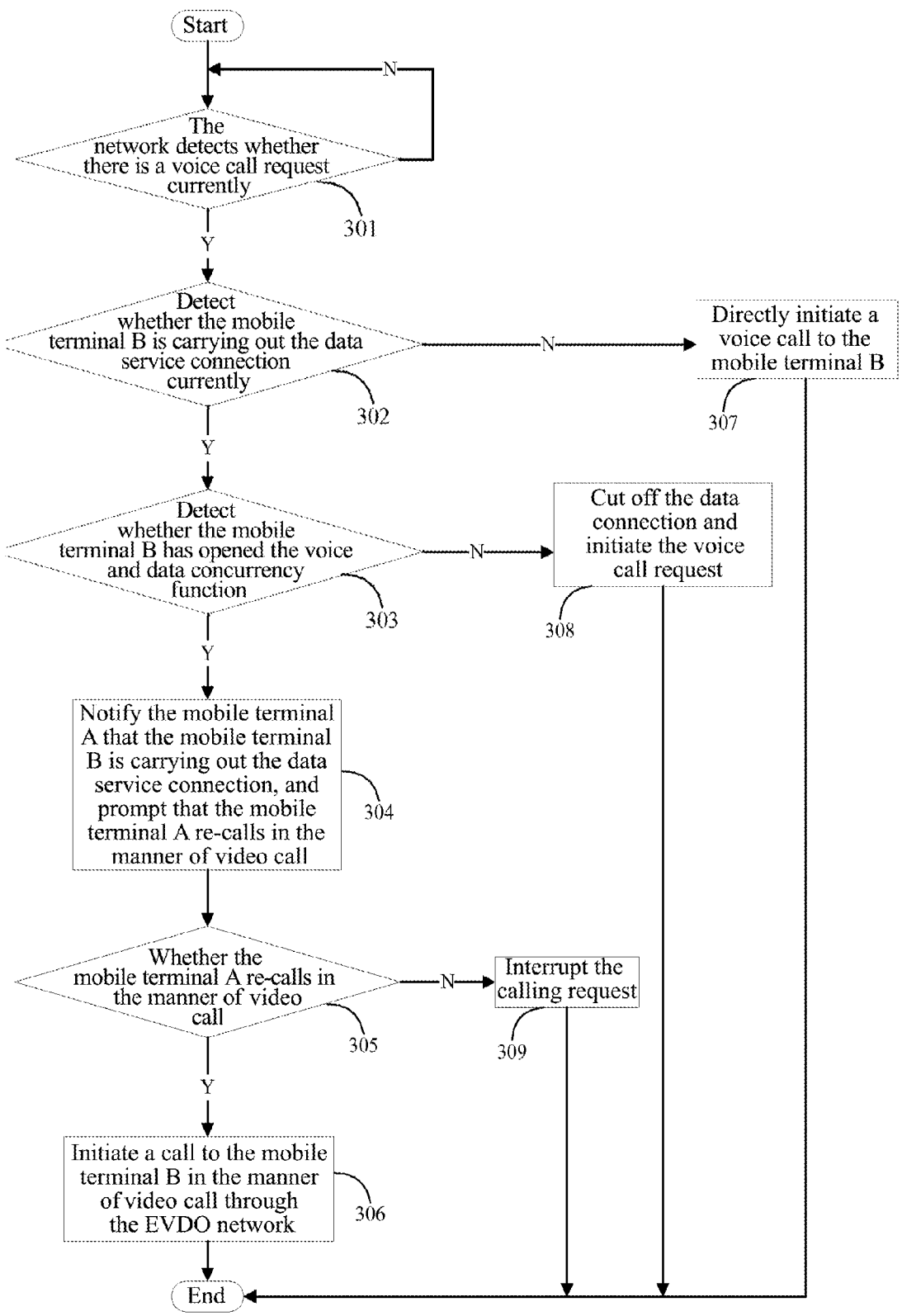
FIG. 3 is a schematic flowchart of a processing of a network side when detecting that a calling mobile terminal initiating a voice call to a called mobile terminal in a method according to an embodiment of the present invention.

As shown in FIG. 3, FIG. 3 is a schematic flowchart of a processing of a network side when detecting that a calling mobile terminal (here, it is assumed that a mobile terminal A acts as the calling mobile terminal) initiating a voice call to a called mobile terminal (here, it is assumed that a mobile terminal B acts as the called mobile terminal) in a method according to an embodiment of the present invention, and it includes the following steps.

In step 301, the network side detects whether there is a voice call request currently, if there is no voice call request, then it goes to step 301, and if the network side detects that there is a voice call request sent from the mobile terminal A, then step 302 is continued.

In step 302, the network side detects whether the mobile terminal B is carrying out a data service connection through EVDO by the difference of a frequency point where the mobile terminal B is located, if the mobile terminal B does not carry out the data service connection, then it goes to step 307, if the mobile terminal B is carrying out a data service connection, then step 303 is continued.

In step 303, the network side detects whether the mobile terminal B has opened a voice and data concurrency function, if the mobile terminal B does not open the voice and data concurrency function, then it goes to step 308, if the mobile terminal B has opened the voice and data concurrency function, then step 304 is continued.

In step 304, the network side plays a voice notification to the mobile terminal A, notifies the mobile terminal A of a request that the mobile terminal B is carrying out the data service connection, and prompts that the mobile terminal A can re-initiate a call in the manner of the video call; and step 305 is continued.

In step 305, it detects whether the mobile terminal A re-initiates the call in the manner of the video call, if the mobile terminal A re-initiates the call in the manner of the video call, then step 306 is continued, and if the mobile terminal A does not re-initiate the call, it goes to step 309.

In step 306, the mobile terminal A re-initiates the call in the manner of the video call, and the network initiates a video call to the mobile terminal B in the manner of packet transmission through EVDO; and the current flow ends.

In step 307, the network detects that the mobile terminal B does not carry out the data connection by using the EVDO, and directly initiates a voice call to the mobile terminal B; and the current flow ends.

In step 308, the mobile terminal B does not open the voice and data concurrency function, and the network cuts off the data service connection of the mobile terminal B and initiates a common voice call to the mobile terminal B; and the current flow ends.

In step 309, the mobile terminal A does not re-initiate the call to the mobile terminal B in the manner of the video call, and the mobile terminal A is interrupted; and the current flow ends.

Figure 4:
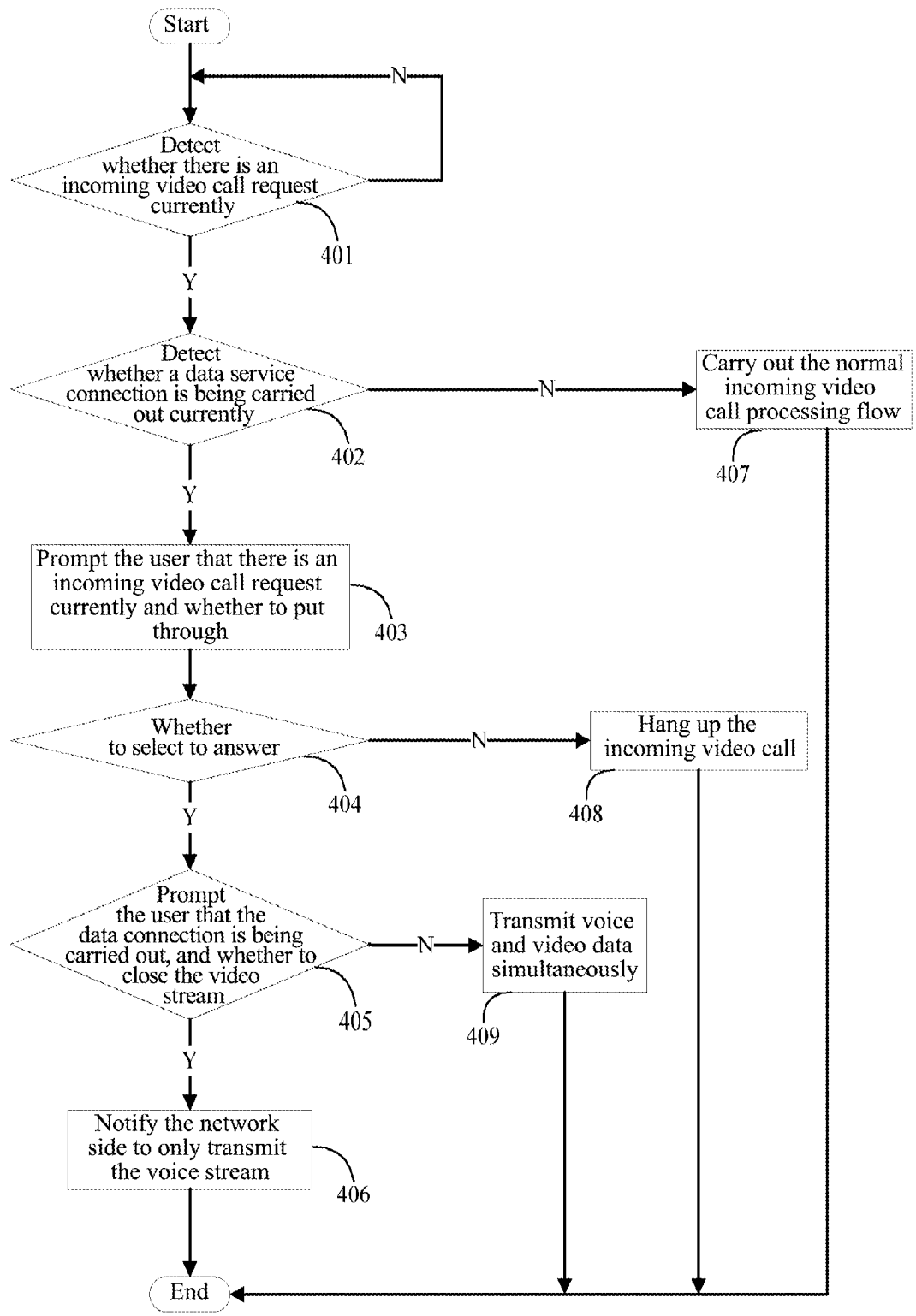
FIG. 4 is a flowchart of a processing of a called mobile terminal when receiving a video call request from a network side in a method according to an embodiment of the present invention.

As shown in FIG. 4, FIG. 4 is a flowchart of a processing of a called mobile terminal when receiving a video call request from a network side in a method according to an embodiment of the present invention, and it mainly includes the following steps.

In step 401, the called mobile terminal (here, it is still the mobile terminal B) detects whether there is an incoming video call request currently, if there is no incoming video call request, then it goes to step 401, and if it detects that there is the incoming video call request, step 402 is continued.

In step 402, the mobile terminal B detects whether a data service connection is being carried out currently, if the mobile terminal B is not in the data service connection, then it goes to step 407, and if the mobile terminal B is in the data service connection, then step 403 is continued.

In step 403, the mobile terminal B prompts the user that there is an incoming video call request currently on a screen and whether to answer, and at the moment, the mobile terminal B is already in the voice and data concurrency; and step 404 is continued.

In step 404, it detects whether the user of the mobile terminal B answers the incoming call, if the user rejects to answer, then it goes to step 408, and if the user answers the incoming call, step 405 is continued.

In step 405, the mobile terminal B prompts on the screen that the user is carrying out the data service connection and whether to only accept the audio stream and close the video stream for ensuring the bandwidth occupation of the data service; herein, if only receiving the video stream, it is equivalent to only carry out the IP call with only voice, if selecting to simultaneously transmit the video stream and the audio stream, then it goes to step 409, and if selecting to close the video stream, then step 406 is continued.

In step 406, it notifies the network side that at the moment only the audio stream will be transmitted, and the network side terminates the transmission of the video stream so as to save bandwidth occupation; and the telephone is put through; and the current flow ends.

In step 407, there is no data service connection currently, and a normal incoming video call processing flow will be carried out; and the current flow ends.

In step 408, that incoming video call is hung up; and the current flow ends.

In step 409, the video stream and the audio stream will be transmitted simultaneously, the telephone is put through, and the video phone is also put through simultaneously in the situation where the data service is maintained to be connected; and the current flow ends.

Figure 5:
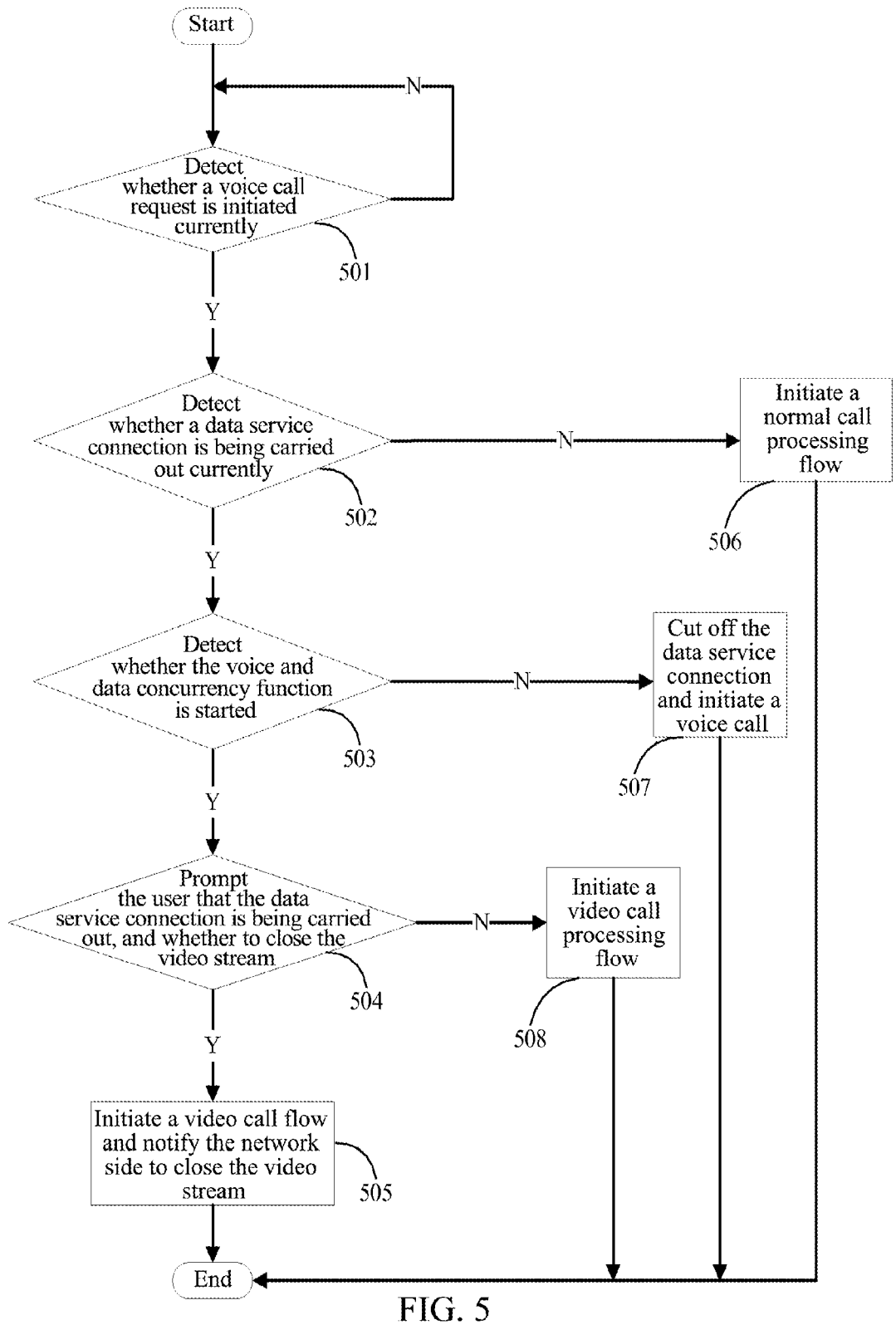
FIG. 5 is a flowchart of a processing of a mobile terminal which has a voice and data concurrency function, as a calling mobile terminal, initiating a voice all in a method according to an embodiment of the present invention.

As shown in FIG. 5, FIG. 5 is a flowchart of a processing when a mobile terminal which has a voice and data concurrency function, as a calling mobile terminal, initiates a voice all in a method according to an embodiment of the present invention; for example, the mobile terminal B related in FIG. 3 and FIG. 4 initiates a video call as the calling mobile terminal at the moment, and the flow mainly includes the following steps.

In step 501, the mobile terminal B detects whether there is a voice call request currently, if there is no voice call request, then it goes to step 501, and if it detects that there is a voice call request, then step 502 is continued.

In step 502, the mobile terminal B detects whether the mobile terminal B itself is carrying out a data service connection currently, if the mobile terminal B does not carry out the data service connection currently, then it goes to step 506, and if the mobile terminal B is carrying out the data service connection currently, then step 503 is continued.

In step 503, the data service connection is being carried out currently, the mobile terminal B detects whether the mobile terminal B itself has opened a voice and data concurrency function, if the mobile terminal B does not open the voice and data concurrency function, then it goes to step 507, and if the mobile terminal B has opened the voice and data concurrency function, then step 504 is continued.

In step 504, the mobile terminal B prompts the user of the mobile terminal B on an interface that it is carrying out the data service connection and whether to close the video stream for ensuring the data service bandwidth; if selecting to start the video stream, then it goes to step 508, and if selecting to close the video stream, then step 505 is continued.

In step 505, it selects to close the video stream, the mobile terminal initiates a video call but only the audio stream is transmitted and the video stream is closed; and the current flow ends.

In step 506, there is no data service connection currently, and a normal voice call processing flow will be initiated; and the current flow ends.

In step 507, it detects that the mobile terminal B does not start the voice and data concurrency function, the data service connection will be cut off, and a voice call will be initiated; and the current flow ends.

In step 508, it selects to transmit the video stream and the audio stream simultaneously, the mobile terminal B initiates a calling flow of the video call, and the voice video and data connection are carried out concurrently; and the current flow ends.

Hereinafter, the apparatus according to an embodiment of the present invention will be illustrated in detail in combination with FIG. 6.

Figure 6:
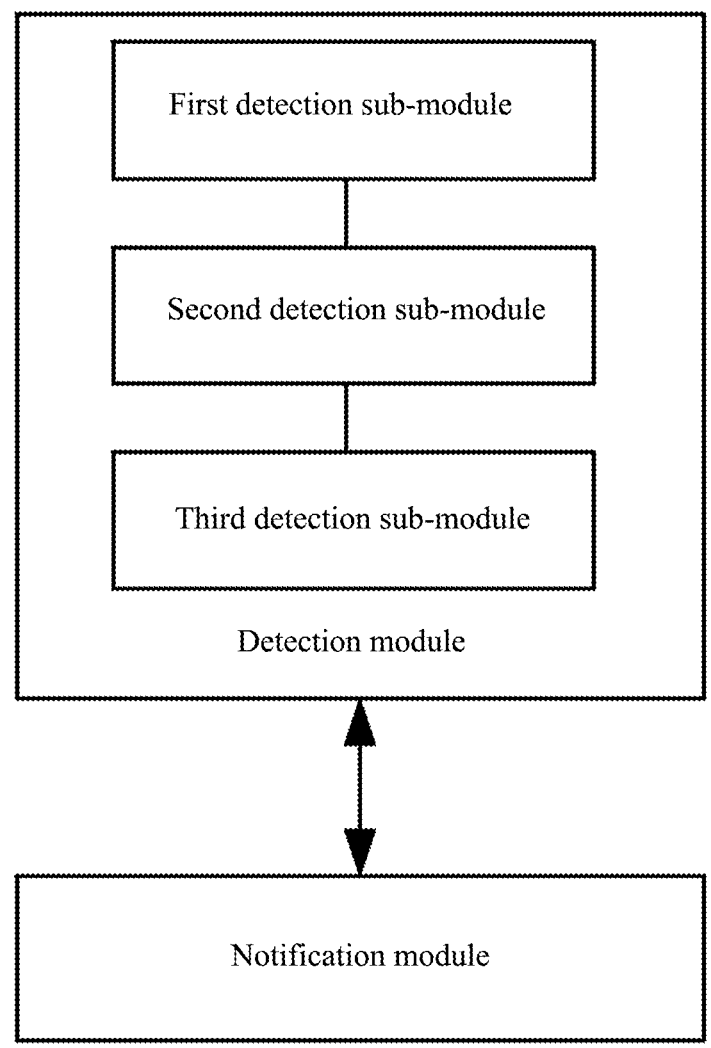
FIG. 6 is a structural diagram of an apparatus according to an embodiment of the present invention.

As shown in FIG. 6, FIG. 6 is a structural diagram of an apparatus according to an embodiment of the present invention, which particularly includes:

a detection module, a notification module, and a voice and data concurrency function setting module.

(I) The detection module is mainly responsible for receiving a voice call request sent by the calling mobile terminal, detecting whether the called mobile terminal of the voice call request is carrying out a data service connection after receiving the voice call request, if determining by detecting that the called mobile terminal of the voice call request is carrying out the data service connection, then triggering the notification module.

The detection module can specifically comprise: a first detection sub-module, a second detection sub-module and a third detection sub-module; wherein, the first detection sub-module is mainly responsible for determining whether the called mobile terminal is carrying out the data service connection by the difference of a frequency point where the called mobile terminal of the voice call request is located when receiving the voice call request, if yes, triggering the second detection sub-module, otherwise, triggering the network side to directly initiate a voice call to the called mobile terminal;

the second detection sub-module is mainly responsible for detecting whether the called mobile terminal has opened the voice and data concurrency function, if yes, triggering the notification module, otherwise, triggering the network side to cut off the data service connection being carried out by the called mobile terminal and to initiate a voice call to the called mobile terminal; and the third detection sub-module is mainly responsible for detecting whether the calling mobile terminal re-initiates a call in the manner of the video call, and when detecting that the calling mobile terminal re-initiates the call in the manner of the video call, triggering the network side to initiate an incoming video call request to the called mobile terminal in a manner of packet transmission through EVDO.

(II) The notification module is mainly responsible for, after being triggered by the detection module, notifying the calling mobile terminal sending the voice call request out of the situation that the called mobile terminal is carrying out the data service connection, and at the same time prompting that the calling mobile terminal can re-initiate a call in the manner of the video call.

(III) The voice and data concurrency function setting module is mainly responsible for, receiving a request of opening the voice and data concurrency function sent by the mobile terminal, and when receiving the request of opening the voice and data concurrency function sent by the mobile terminal, for the mobile terminal which has opened the EVDO data service and has opened the video call service, recording that the state of the voice and data concurrency function of the mobile terminal has been opened.

In conclusion, the embodiments of the present invention provide a method and apparatus for realizing concurrency of voice and data. After the mobile terminal carries out a data connection through the EVDO network, if there is an incoming voice call, the network side can notify the calling mobile terminal of the situation that the called mobile terminal is in the data connection and does not want the data connection to be interrupted, and prompts that the calling user can contact the called mobile terminal by selecting to use the manner of video call; and when the calling mobile terminal re-initiates a call in the manner of video call, since the video call of CDMA2000 1xEVDO is based on packet transmission when using the video call, and by this feature, the called mobile terminal can also realize the concurrency of video and data by the video call capability based on EVDO technology when carrying out the data service connection;

furthermore, as to a mobile terminal which has opened the voice and data concurrency function, as the calling mobile terminal, can also initiate a video call request through the EVDO network when carrying out the data connection by using the EVDO network, so as to realize the concurrency of voice call and data service connection.

Furthermore, when the voice and data service are processed concurrently, although the call is in the manner of video call, however, since the video call and the data service share the data service connection bandwidth, at the moment, the video call can be selected to transmit only voice stream instead of transmitting real video code stream, so as to achieve the purpose of ensuring the data service bandwidth.

What is described above is merely preferable embodiments of the present invention, however, the protection scope of the present invention is not limited to that; changes or replacements which can be easily thought by those skilled in the art within the technical scope disclosed in the present invention shall fall into the protection scope of the present invention. Therefore, the protection scope of the present invention shall be based on the protection scope of the claims.

What we claim is:

1. A method for achieving concurrency of voice and data, comprising: A, a network side receiving a voice call request, and when determining by detecting that a called mobile terminal of the voice call request is carrying out a data service connection, executing step B; and B, the network side notifying a calling mobile terminal sending the voice call request out of a situation that the called mobile terminal is carrying out the data service connection, and prompting the calling mobile terminal to re-initiate a call in a manner of a video call; wherein, the step A comprises: A1, the network side determining whether the called mobile terminal is carrying out the data service connection by detecting that a frequency point where the called mobile terminal of the voice call request is located is different, if the called mobile terminal is carrying out the data service connection, then executing step A2, otherwise, directly initiating a voice call to the called mobile terminal; and A2, detecting whether the called mobile terminal has opened a voice and data concurrency function, if the called mobile terminal has opened the voice and data concurrency function, then executing the step B, otherwise, cutting off the data service connection which is being carried out by the called mobile terminal and initiating the voice call to the called mobile terminal.

2. The method according to claim 1, further comprising:
C, when the network side detecting that the calling mobile terminal re-initiates the call in the manner of the video call, initiating an incoming video call request to the called mobile terminal in a manner of packet transmission.

3. The method according to claim 2, further comprising:
D, the called mobile terminal detecting that there is an incoming video call request when being carrying out the data service connection, and selecting to answer the incoming video call or reject the incoming video call according to a user requirement of the called mobile terminal.

4. The method according to claim 3, wherein, the step D comprises:
D1, when the called mobile terminal detects that there is an incoming video call request, judging whether the called mobile terminal is carrying out the data service connection, if the called mobile terminal is carrying out the data service connection, then executing step D2, otherwise, directly answering the incoming video call or reject the incoming video call; and
D2, prompting a user of the called mobile terminal whether to answer the incoming video call, if yes, then the user of the called mobile terminal answering the incoming video call, otherwise, rejecting the incoming video call.

5. The method according to claim 4, wherein, in the step D2, the user of the called mobile terminal answering the incoming video call comprises: the user of the called mobile terminal answering the incoming video call in a manner of only receiving a video stream, only receiving an audio stream, or simultaneously receiving a video stream and an audio stream.

6. The method according to claim 1, wherein, the opening the voice and data concurrency function comprises: a mobile terminal sending a request of opening the voice and data concurrency function to the network side; and after the network side receives the request of opening the voice and data concurrency function sent from the mobile terminal, recording a state that the mobile terminal has opened the voice and data concurrency service function regarding to the mobile terminal which has opened a data service and has opened a video call service.

7. The method according to claim 1, wherein, for a mobile terminal which has opened and started the voice and data concurrency function, when the mobile terminal, as the calling mobile terminal, prepares to initiate the voice call request, the method further comprises: detecting whether the mobile terminal is carrying out the data service connection, if the mobile terminal is carrying out the data service connection, then notifying a user of the mobile terminal of a situation that the mobile terminal is carrying out the data service connection, and initiating a corresponding video call according to a selection of the user of the mobile terminal, otherwise, the mobile terminal directly initiating the voice call request.

8. The method according to claim 1, further comprising: C, when the network side detecting that the calling mobile terminal re-initiates the call in the manner of the video call, initiating an incoming video call request to the called mobile terminal in a manner of packet transmission.

9. The method according to claim 8, further comprising:
D, the called mobile terminal detecting that there is an incoming video call request when being carrying out the data service connection, and selecting to answer the incoming video call or reject the incoming video call according to a user requirement of the called mobile terminal.

10. The method according to claim 9, wherein, the step D comprises:
D1, when the called mobile terminal detects that there is an incoming video call request, judging whether the called mobile terminal is carrying out the data service connection, if the called mobile terminal is carrying out the data service connection, then executing step D2, otherwise, directly answering the incoming video call or reject the incoming video call; and
D2, prompting a user of the called mobile terminal whether to answer the incoming video call, if yes, then the user of the called mobile terminal answering the incoming video call, otherwise, rejecting the incoming video call.

11. The method according to claim 10, wherein, in the step D2, the user of the called mobile terminal answering the incoming video call comprises: the user of the called mobile terminal answering the incoming video call in a manner of only receiving a video stream, only receiving an audio stream, or simultaneously receiving a video stream and an audio stream.

12. An apparatus for realizing concurrency of voice and data, comprising: a detection module and a notification module; wherein, the detection module is configured to detect whether a called mobile terminal which receives a voice call request is carrying out a data service connection, and trigger the notification module when determining by detecting that the called mobile terminal of the voice call request is carrying out the data service connection; and the notification module is configured to notify a calling mobile terminal which sends the voice call request out of a situation that the called mobile terminal is carrying out the data service connection, and at the same time prompt the calling mobile terminal to re-initiate a call in a manner of a video call; wherein, the detection module comprises: a first detection sub-module and a second detection sub-module; wherein, the first detection sub-module is configured to determine whether the called mobile terminal is carrying out the data service connection by detecting that a frequency point where the called mobile terminal of the voice call request is located is different when receiving the voice call request, and if the called mobile terminal is carrying out the data service connection, trigger the second detection sub-module, and if the called mobile terminal does not carry out the data service connection, trigger a network side to directly initiate a voice call to the called mobile terminal; and the second detection sub-module is configured to detect whether the called mobile terminal has opened a voice and data concurrency function, if the called mobile terminal has opened the voice and data concurrency function, trigger the notification module, and if the called mobile terminal does not open the voice and data concurrency function, trigger the network side to cut off the data service connection which is being carried out by the called mobile terminal and initiating a voice call to the called mobile terminal.

13. The apparatus according to claim 12, wherein, the detection module further comprises: a third detection sub-module, configured to detect whether the calling mobile terminal re-initiates the call in the manner of the video call, and if the calling mobile terminal re-initiates the call in the manner of the video call, trigger a network side to initiate an incoming video call request to the called mobile terminal in a manner of packet transmission.

14. The apparatus according to claim 12, further comprising: a voice and data concurrency function setting module, configured to, when receiving a request of opening the voice and data concurrency function sent by a mobile terminal, for a mobile terminal which has opened a data service and has opened a video call service, record a state that the mobile terminal has opened the voice and data concurrency service function.

15. The apparatus according to claim 12, wherein, the detection module further comprises: a third detection sub-module, configured to detect whether the calling mobile terminal re-initiates the call in the manner of the video call, and if the calling mobile terminal re-initiates the call in the manner of the video call, trigger a network side to initiate an incoming video call request to the called mobile terminal in a manner of packet transmission.

* * * * *